United States Patent [19]

Gawlick

[11] Patent Number: 5,239,828
[45] Date of Patent: Aug. 31, 1993

[54] TWO-STAGE VALVE

[75] Inventor: Dieter Gawlick, Ludwigshafen, Fed. Rep. of Germany

[73] Assignee: Deere & Company, Moline, Ill.

[21] Appl. No.: 951,511

[22] Filed: Sep. 25, 1992

[30] Foreign Application Priority Data

Sep. 27, 1991 [DE] Fed. Rep. of Germany ....... 4132245

[51] Int. Cl.⁵ .......................... F15B 7/00; B60T 13/00
[52] U.S. Cl. .................................. 60/581; 60/547.1; 303/71; 303/84.2
[58] Field of Search ................. 60/533, 581, 584, 589, 60/585, 574, 578, 579, 597.1; 303/68, 71, 84.2

[56] References Cited

U.S. PATENT DOCUMENTS

| | | | |
|---|---|---|---|
| 4,262,969 | 4/1981 | Chatterjea | 303/71 |
| 4,738,109 | 4/1988 | Miller et al. | 60/578 |
| 4,963,692 | 10/1990 | Halabiya | 60/581 X |
| 5,020,864 | 6/1991 | Tanaka | 303/68 X |
| 5,076,647 | 12/1991 | Grana et al. | 303/68 X |
| 5,152,588 | 10/1992 | Bright et al. | 303/68 X |

FOREIGN PATENT DOCUMENTS

| | | | |
|---|---|---|---|
| 0343116 | 11/1989 | European Pat. Off. | 303/68 |
| 1680211 | 4/1971 | Fed. Rep. of Germany. | |
| 3517958 | 11/1986 | Fed. Rep. of Germany. | |

*Primary Examiner*—Edward K. Look
*Assistant Examiner*—Hoang Nguyen

[57] ABSTRACT

A two-stage brake control valve has a larger first stage and a smaller second stage. First stage operates to fill a brake. Then, after a transition phase only the second stage is used to supply the working pressure. A check valve is between the first stage pressure chamber a sump. The check valve opens if the pressure in the first stage pressure chamber exceeds a predetermined value. To minimize the operating force of the valve and to avoid a sudden change of the valve working pressure during the changing phase, the closing force of the check valve is controlled as a function of the valve working pressure. The valve working pressure acts on a valve spool which influences the closing force of the check valve in the way that the closing force decreases with increasing working pressure.

7 Claims, 2 Drawing Sheets

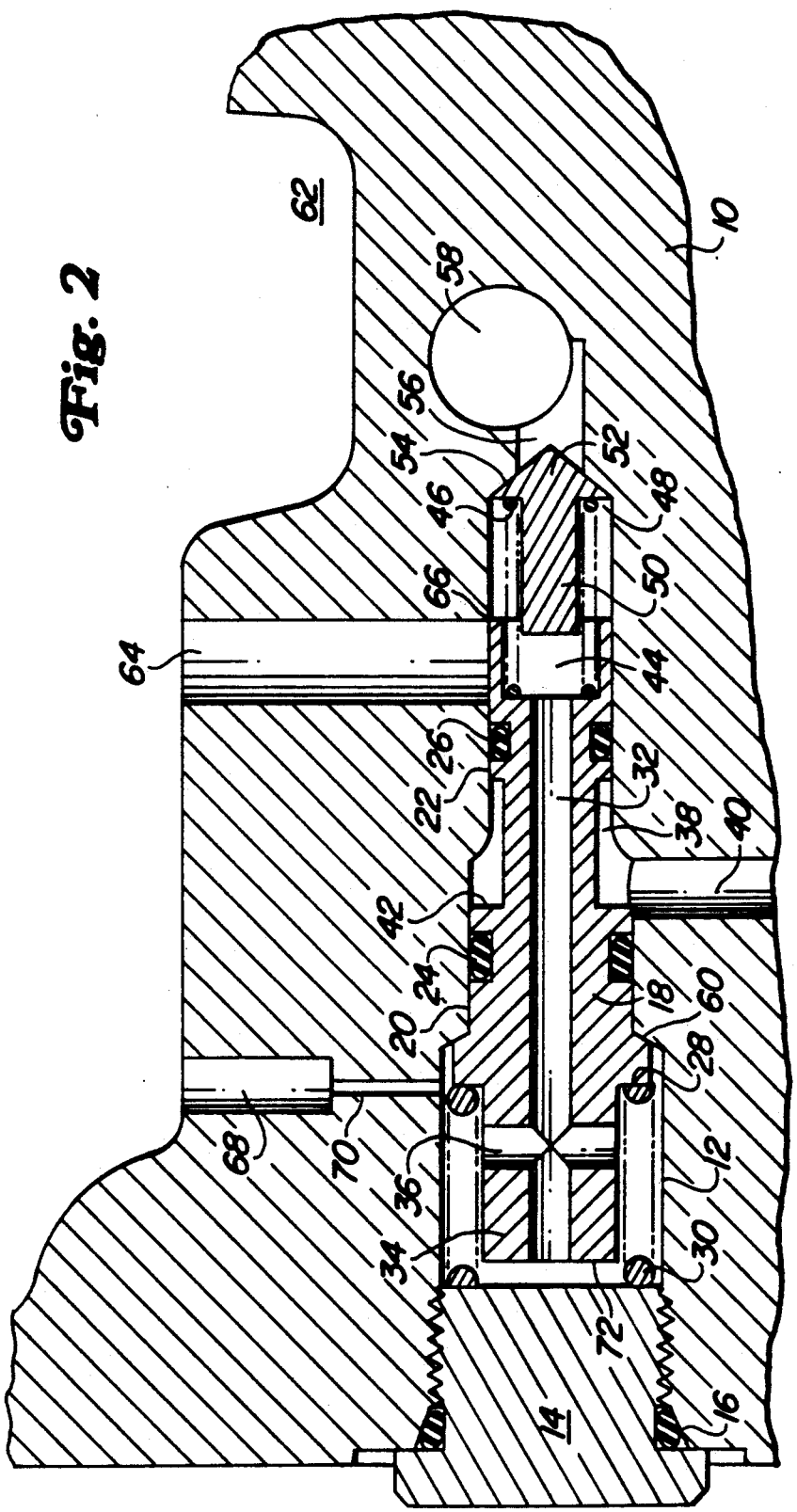

TWO-STAGE VALVE

BACKGROUND OF THE INVENTION

The invention concerns a two-stage valve, in particular a brake valve.

It is known to provide a two-stage brake valve which includes a first stage with a larger effective area used initially to fill a brake system component and a second stage with a smaller effective area used in succession following a transition phase to generate an operating pressure. It is also known to provide such a two-stage brake valve with a check valve arranged between the pressure chamber of the first stage add a reservoir, which opens upon a pre-determined brake pressure existing in the first stage pressure chamber.

A two-stage brake valve of the aforementioned type has become known from DE-A-1 680 211, which includes a fill piston with a large effective area. The fill piston slides and is sealed in a bore in the valve housing and can be moved in the bore by a piston rod. The piston rod can be actuated by an operator through a brake pedal and associated linkages. The fill piston pressurizes fluid in a first pressure chamber. The fill piston contains an axial bore open to its end face, which receives a hollow sleeve fixed to the valve body but which can move within the bore. The axial bore in the fill piston forms a second pressure chamber with a smaller effective area. The sleeve is provided with a central bore through which the second pressure chamber is connected to the brake line. The first pressure chamber is connected to a reservoir through a return line containing a check valve. The check valve opens when a predetermined pressure in the first pressure chamber is exceeded.

Between the second pressure chamber and the first pressure chamber a valve arrangement is located which initially permits an exchange of fluid between the pressure chambers and then seals these off against each other only after a predetermined pressure difference between the pressure chambers is exceeded. During a first phase of movement of the fill piston the brake chamber of the brake is filled until the pressure in the first pressure chamber increases to the point at which the check valve opens. Upon further actuation of the fill piston the pressure in the second pressure chamber increases further and leads to a closing of the valve arrangement between the pressure chambers, so that in a pressure phase only the smaller effective area of the shank is used to generate the operating pressure, and a high braking pressure can be applied with comparatively lower actuating force. However, during the pressure phase there exists in the first pressure chamber a continuing pressure corresponding to the opening pressure of the check valve. Therefore the operator must apply a force in addition to that required to generate the operating pressure which corresponds to the opening pressure in the first pressure chamber.

In order to reduce the required pressure during the pressure phase, a brake valve was proposed by DE-A-38 37 650, which is configured similar to the valve described above, in which, however, the first pressure chamber is constantly connected directly to the reservoir during the pressure phase. However, this leads to a sudden pressure drop in the pressure chamber during the transition from the fill phase to the pressure phase.

In the case of the last named brake valve, it has been shown that upon the transition from the larger effective area to the smaller effective area, in which a connection between the first pressure chamber and the reservoir is suddenly opened, the pressure in the second pressure chamber is at a nearly constant pressure level for the time of the transition, and therefore the required pedal force is suddenly reduced. The operator, with a limited reaction time, cannot adjust rapidly enough to this sudden change in the force requirement. As a result the operator will depress the brake pedal with a constant force, as was required for the larger effective area during the filling of the brake, also during the second pressure phase in which only the smaller effective area is used. If the actuating force is held constant, a higher pressure will be generated with the smaller effective area as compared to the larger effective area. A substantial increase in the pressure in the line to the brake cylinder (actuating device) results in a sudden increase in the braking force and therewith a sudden increase in the deceleration of the vehicle. This means that the relationship between the pedal force and deceleration is not proportional or follows some other transition, but experiences a sudden jump, which is not permissible or at least not desired in vehicle brakes.

SUMMARY OF THE INVENTION

Accordingly, an object of this invention is to provide a two-stage valve of the aforementioned type, in which the required actuating force can be kept small, and a sudden change in the operating pressure can be avoided, in particular during the passage through the transition phase.

These and other objects are achieved by the present invention, which provides a two-stage valve wherein the closing pressure of the check valve corresponds to the predetermined brake force, and is controlled in relation to the operating pressure.

The control is preferably performed in such a way that, during and after the transition phase, the hydraulic fluid flows out of the first pressure chamber with continually falling back pressure and increasing operating pressure (brake pressure). This gradual reduction in the pressure in the first pressure chamber produces a smooth transition of the characteristic curve of force and operating pressure (actuating force-brake pressure characteristic curve) during the transition phase in which a transition is made from a fill phase in which the larger effective area is used, to a pressure phase in which the smaller effective area is used. The pressure in the first pressure chamber can become so low, upon reaching a certain operating pressure, that it corresponds to the pressure in the reservoir, so that almost no force must be applied to overcome the pressure in the aforesaid pressure chamber.

Preferably the check valve is provided with a valve body, for example, a valve cone or a valve ball, which lifts off from its seat when sufficient pressure exists in the first chamber against the force of a check valve spring and opens a passage to the reservoir. The force of the check valve spring that is applied to the valve body is most appropriately controlled in relation to the operating pressure.

According to a preferred embodiment of the invention, the operating pressure is applied to a control valve spool which controls the closing force of the check valve in such a way that it decreases with increasing operating pressure. The control valve spool is exposed on one side to the operating pressure and on the other side to the opposing force of a control valve spool spring.

An appropriate characteristic curve results from the fact that the control valve spool is forced by the operating pressure in a direction in which it affects the closing arrangement of the check valve so that the closing force decreases with increasing operating pressure.

A simple and effective embodiment of the invention is provided by the check valve spring that is supported on the control valve spool and applies a force to the control valve spool in the same direction as the operating pressure. Most appropriately the force of the check valve spring is less than the spring force of the control valve spool spring.

In order to counteract a rapid response of the control valve spool and to damp resulting vibrations, it is advantageous that the chamber enclosed by the control valve spool and located on the side of the larger area is connected to the reservoir by at least one throttled equalizing channel. Furthermore, it is also appropriate to provide a longitudinal channel in the control valve spool through which both end faces are connected to each other. These characteristics counteract a pressure build-up on the side of the control valve spool facing away from the check valve during the entry into the transition phase, which would result in a rapid movement of the control valve spool and thereby a rapid opening of the check valve, whereby a vibratory condition is counteracted.

BRIEF DESCRIPTION OF THE DRAWINGS

FIG. 2 is an enlarged cross section view of a control valve associated with the brake valve.

DETAILED DESCRIPTION

Figure 1:
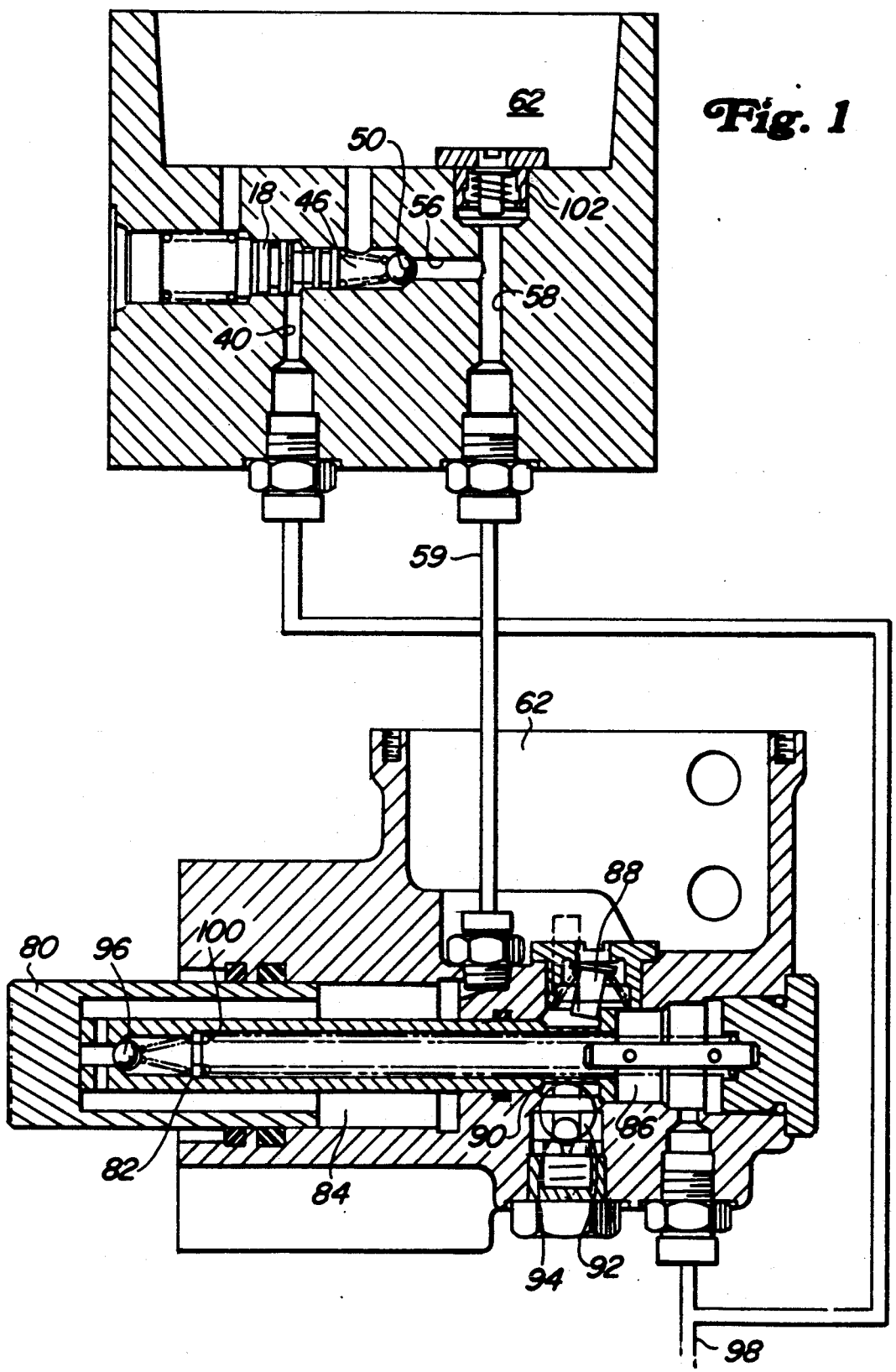
FIG. 1 is a cross section view of a two-stage brake valve according to the invention.

The lower region of FIG. 1 shows a cross section through a stepped main cylinder of a brake valve, which engages two pistons of differing diameters. These are a large fill piston 80 and a small pressure piston 82. The pressure chambers of these pistons are correspondingly defined as fill stage 84 and pressure stage 86.

The operation of this stepped main cylinder is as follows: Actuation of the brake pedal (not shown) produces a combined pressure on the fill piston 80 and the pressure piston 82. As soon as the piston movement begins, the inlet valve 88 is freed, and it closes immediately. Shortly thereafter the piston collar 90 of the pressure piston 82 presses against the ball of the equalizing valve 92 and opens it. The pressure stage 86 behind the pressure piston 82 is now closed to the reservoir 62.

The equalizing valve 92 is connected through a transverse bore 94 with the equalizing valve of a second brake valve, (not shown), where one brake valve is provided for a left and the other brake valve for a right service brake. When the left as well as the right brake pedal is actuated, both equalizing valves open, so that pressure equalization between both brakes takes place and uniform braking is made possible.

With an equal actuation path the fill piston 80 must displace a larger volume of oil than the pressure piston 82. Therefore an excess pressure is generated in the fill stage 84 which opens the check valve 96. Upon further forward movement of the pistons 80, 82, oil from the fill stage 84 is forced through the check valve 96 into the pressure stage 86 and from there further into the brake line 98 and into the brake. Thereby the pressure ring (not shown) of the brake (not shown) is brought into contact with its brake disk (not shown). This occurs after a relatively short piston stroke. With further forward movement of the pistons 80, 82 the brake pressure increases.

If the brake pedal is released, the main spring 100 returns the pistons 80, 82 into their initial position. As the fill piston 80 returns it draws oil from the reservoir 62 through the relief valve 102. The oil return flow from the brake reaches the pressure stage 86. Pressure is equalized through the inlet valve 88 which is opened in the equalizing position of the pressure piston 82.

Therefore, the braking process is structured in two phases. In the first phase a large volume of oil is displaced with a small piston movement, and the brake brought into contact. In the second phase a high pressure is generated with lower force. The first phase is designated the fill phase, the second as pressure phase.

In order to have the brake pedal force during braking increase uniformly with the brake pressure, the transition from the fill phase to the pressure phase is controlled smoothly by the control valve shown in the upper region of FIG. 1.

Referring now to FIG. 2, the valve housing 10 contains a stepped bore 12, whose diameter is decreased at increased depth. The bore 12 is sealed by a threaded plug 14 which carries a seal 16. The bore 12 slidably receives an axially moveable control valve spool 18. The valve spool 18 has a large diameter section 20 and a small diameter section 22. These sections sealingly and slidably engage the walls of the bore 12 and carry O-ring seals 24, 26. A helical compression spring 30 is compressed between the plug 14 and an annular shoulder 28 of the control valve spool 18 and forces the control valve spool 18 into the interior of the bore 12.

An axial, longitudinal channel 32 extends through the entire length of the control valve spool 18. A projection 34 of the control valve spool 18 extends beyond the shoulder 28 in the direction of the plug 14 and contains a radial bore 36 that connects the longitudinal channel 32 with the outer contour of the control valve spool.

The control valve spool 18 includes an annular groove 38 in its central region, between the sections 20 and 22. A channel 40 in the valve housing 10 communicates the operating pressure of the brake valve to groove 38, and is connected to a line 98 running between the brake valve and the brake (not shown). A shoulder 42 joins section 20 to groove 38. Fluid pressure in the channel 40 therefore acts upon the shoulder 42 and forces the control valve spool 18 against the force of the spring 30 in a direction towards the plug 14.

A cylindrical recess 44 is formed in the end of the control valve spool 18 opposite the plug 14. Recess 44 receives a helical compression spring 46. One end of spring 46 engages the bottom surface of recess 44. The other end of spring 46 is seated against a radial surface 48 of the body of a check valve 50. Check valve 50 has a conical end or valve cone 52 on its end facing away from the control valve spool 18. The valve cone 52 operates with a seat 54 in the bore 12, whose end 56, located at its greatest depth in the valve housing 10, is connected to a relief channel 58. The relief channel 58 establishes a connection to the fill stage 84 of the brake valve through the line 59.

MODE OF OPERATION

When no pressure is applied the control valve spool 18 is forced by the spring 30 away from the plug 14 until its shoulder 60 makes contact with a corresponding shoulder in the bore 12, as best seen in FIG. 2. The check valve spring 46 is supported in the recess 44 in the control valve spool 18 and forces the valve cone 52 of the valve body 50 against the seat 54, whereby the end 56 of the bore 12 as well as the relief channel 58 are closed. Therefore, upon initial actuation of the brake valve, a pressure build-up can be generated in the first chamber 84.

This pressure can increase up to a predetermined pressure level at which the brake valve makes the transition into its pressure phase. At this pressure the valve cone 52 lifts off from its seat 54 against the force of the check valve spring 46 and the check valve opens somewhat. The initial opening movement of the valve cone 52 does not immediately result directly in a movement of the control valve spool 18, since the spring force of the check valve spring 46 is less than that of the control valve spool spring 30.

The operating pressure of the brake valve is applied through the channel 40 to the step 42. As long as this pressure is not high enough to move the control valve spool 18 from its rest position against the force of the spring 30, the outer surface 45 of the control valve spool 18 surrounding the recess 44 blocks the flow from the relief channel 58 into an outlet channel 64 which communicates into the reservoir 62. The outer surface 45 interacts with the outlet channel 64 to form a port control edge 66 which permits precise metering of the fluid flow out of the relief channel 58 into the reservoir 62.

When the predetermined pressure is reached (for instance 6 Bar), the pressure phase of the brake valve is initiated and the pressure in the channel 40 increases to the point at which it is able to move the control valve spool 18 against the force of spring 30 towards the plug 14. Thereby, the outer surface 45 also moves and opens a passage at the port control edge 66 between the relief channel 58 and the outlet channel 64, so that the pressure in the fill stage 84 of the brake valve can slowly bleed off. With increasing operating pressure the control valve spool 18 is moved further against the force of spring 30, so that the opening at the port control edge 66 becomes larger and the pre-load of the check valve spring 46 is continually reduced, resulting in a continuously larger pressure reduction in the fill stage 84 of the brake valve. The control valve spool 18 can be moved at until the end face 72 of the projection 34 comes into contact with the plug 14.

Accordingly, the fill stage 84 of the brake valve is not emptied all of a sudden, but slowly against the force of the check valve spring 46. If the check valve spring 46 were supported against the valve housing 10, the necessary pressure in the fill stage to overcome this spring force would always have to be generated by the large fill piston 80. This would require an unnecessary amount of force.

The longitudinal channel 32 in the control valve spool 18 prevents a pressure difference from building up to either side of control valve spool 18 upon opening of the valve body 50, which would apply an additional axial force to the control valve spool 18. The radial bore 36 permits pressure equalization, even when the projection 34 is in contact with the plug 14 and closes the longitudinal channel 32.

The region of the bore 12 adjacent to the plug 14 is connected with the reservoir 62 through an equalizing channel 68. The equalizing channel 68 contains a section configured as a throttling restriction 70. Through this restriction a pressure in the bore 12 can bleed off only gradually, which counteracts any rapid opening of the valve body 50. This leads to a damped performance which suppresses any possible vibration of the valve body 50.

The design of the check valve spring 46 and the control valve spool spring 30 is such that under a movement of the valve cone 50(?) to its maximum possible stroke, the force applied by the check valve spring 46 to the control valve spool 18, leads only to a movement of the control valve spool 18 to approximately one-tenth of its maximum stroke.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims. For example, the valve arrangement shown in FIG. 2 can also be applied to a brake valve as was described by DE-A-1 680 211.

I claim:

1. A two-stage brake valve including a first stage pressure chamber having a larger effective area which operates to fill a brake system component during an initial brake filling phase, a second stage pressure chamber having a smaller effective area which operates to generate a brake operating pressure during a braking phase following a transition phase, and a check valve connected between the first stage pressure chamber and a reservoir, the check valve opening in response to a predetermined pressure existing in the first stage pressure chamber, characterized by:

means for controlling a closing pressure of the check valve as a function of the brake operating pressure, the means for controlling comprising a control valve spool coupled to the check valve, the brake operating pressure acting upon the control valve spool in such a way that the closing pressure decreases with increasing brake operating pressure, the control valve spool comprising a large diameter section and a small diameter section, the spool forming a groove between the sections, the groove being exposed to the brake operating pressure, and the sections having outer ends which are not exposed to the operating pressure.

2. A two-stage brake valve including a first stage pressure chamber having a larger effective area which operates to fill a brake system component during an initial brake filling phase, a second stage pressure chamber having a smaller effective area which operates to generate a brake operating pressure during a braking phase following a transition phase, and a check valve connected between the first stage pressure chamber and a reservoir, the check valve opening in response to a predetermined pressure existing in the first stage pressure chamber, characterized by:

means for controlling a closing pressure of the check valve as a function of the brake operating pressure, the means for controlling comprising a control valve spool which controls the closing pressure of the check valve, the brake operating pressure acting upon the control valve spool in such a way that the closing pressure decreases with increasing operating pressure; and the check valve comprises a check valve spring which engages the control valve spool and urges the control valve spool in the same direction as the brake operating pressure.

3. A two-stage brake valve including a first stage pressure chamber having a larger effective area which operates to fill a brake system component during an initial brake filling phase, a second stage pressure chamber having a smaller effective area which operates to generate a brake operating pressure during a braking phase following a transition phase, and a check valve connected between the first stage pressure chamber and a reservoir, the check valve opening in response to a predetermined pressure existing in the first stage pressure chamber, characterized by:

means for controlling a closing pressure of the check valve as a function of the brake operating pressure, the means for controlling comprising a control valve spool which controls the closing pressure of the check valve, the brake operating pressure acting upon the control valve spool in such a way that the closing pressure decreases with increasing operating pressure; and the check valve comprising a valve body which cooperates with an associated seat to control communication through a passage to the reservoir and a check valve spring which urges the valve body into engagement with the seat, the valve body lifting off from the seat under the influence of sufficient pressure in the first stage pressure chamber against the force of a check valve spring to open the passage to the reservoir, the check valve spring comprising a compression spring which is held between an end face of the control valve spool and the body of the check valve.

4. A two-stage brake valve including a first stage pressure chamber having a larger effective area which operates to fill a brake system component during an initial brake filling phase, a second stage pressure chamber having a smaller effective area which operates to generate a brake operating pressure during a braking phase following a transition phase, and a check valve connected between the first stage pressure chamber and a reservoir, the check valve opening in response to a predetermined pressure existing in the first stage pressure chamber, characterized by:

means for controlling a closing pressure of the check valve as a function of the brake operating pressure, the means for controlling comprising a control valve spool which controls the closing pressure of the check valve, the brake operating pressure acting upon the control valve spool in such a way that the closing pressure decreases with increasing brake operating pressure;

a control valve spring urges the control valve spool to a rest position against the brake operating pressure;

the check valve comprising a valve body which cooperates with an associated seat to control communication through a passage to the reservoir and a check valve spring which urges the valve body into engagement with the seat, the valve body lifting off from the seat under the influence of sufficient pressure in the first stage pressure chamber against the force of the check valve spring to open the passage to the reservoir;

the check valve spring having a spring force which is lower than a spring force of the control valve spool spring.

5. A two-stage brake valve including a first stage pressure chamber having a larger effective area which operates to fill a brake system component during an initial brake filling phase, a second stage pressure chamber having a smaller effective area which operates to generate a brake operating pressure during a braking phase following a transition phase, and a check valve connected between the first stage pressure chamber and a reservoir, the check valve opening in response to a predetermined pressure existing in the first stage pressure chamber, characterized by:

means for controlling a closing pressure of the check valve as a function of the brake operating pressure;

the means for controlling comprising a control valve spool movable in a valve bore to control the closing pressure of the check valve, the brake operating pressure acting upon the control valve spool in such a way that the closing pressure decreases with increasing brake operating pressure;

the control valve spool comprising a large diameter section and a small diameter section, the spool forming a groove between the sections, the groove being exposed to the brake operating pressure, and the sections having outer ends which are not exposed to the brake operating pressure; and a wall of the valve bore and the large diameter section of the control valve spool enclosing a control valve chamber and an equalizing channel communicates the control valve chamber with the reservoir.

6. A two-stage brake valve including a first stage pressure chamber having a larger effective area which operates to fill a brake system component during an initial brake filling phase, a second stage pressure chamber having a smaller effective area which operates to generate a brake operating pressure during a braking phase following a transition phase, and a check valve connected between the first stage pressure chamber and a reservoir, the check valve opening in response to a predetermined pressure existing in the first stage pressure chamber, characterized by:

means for controlling a closing pressure of the check valve as a function of the brake operating pressure, the means for controlling comprising a control valve spool having a longitudinal channel extending therethrough, the control valve spool controlling the closing pressure of the check valve, the brake operating pressure acting upon the control valve spool in such a way that the closing pressure decreases with increasing brake operating pressure.

7. The valve of claim 5, wherein:

the equalizing channel is provided with a throttling restriction.

* * * * *